United States Patent [19]

Bogeskov et al.

[11] 3,791,411
[45] Feb. 12, 1974

[54] HYDRAULIC COUPLER

[76] Inventors: Bernard E. Bogeskov, 1895 Meadowview Rd.; Ronald D. Boyum, 9524 Pleasant Ave. South, both of Minneapolis, Minn.

[22] Filed: Aug. 18, 1972

[21] Appl. No.: 281,930

[52] U.S. Cl............. 137/614.02, 285/277, 251/149.6
[51] Int. Cl........................... F16l 29/00, F16l 37/28
[58] Field of Search.........137/614, 614.01, 614.02, 137/614.03, 614.04, 614.05, 614.06, 454.6; 251/149.6, 149.9; 285/277, 304, 306, 307

[56] References Cited
UNITED STATES PATENTS

| 3,477,468 | 11/1969 | Kopaska | 137/614.05 |
|---|---|---|---|
| 3,674,051 | 7/1972 | Stratman | 137/614.02 X |
| 3,646,964 | 3/1972 | Stratman | 137/614.03 |
| 3,599,670 | 8/1971 | Gurner | 137/614 |
| 3,530,887 | 9/1970 | Stratman | 137/614.05 |
| 3,490,491 | 1/1970 | Kopaska | 137/614.05 |
| 3,482,602 | 12/1969 | Jornagan et al. | 137/614.03 |
| 3,174,508 | 3/1965 | Zahuranec | 137/614.04 |

*Primary Examiner*—Samuel Scott
*Assistant Examiner*—Ira S. Lazarus
*Attorney, Agent, or Firm*—Merchant, Gould, Smith & Edell

[57] ABSTRACT

A female coupler for coupling and uncoupling a source of hydraulic fluid under pressure with a male coupler which leads to an implement to receive fluid is disclosed. The female coupler has a main body with a bore therein adapted to receive the source of hydraulic fluid and a cartridge assembly which includes a housing, a sleeve which is movable interior of and with respect to the housing, and a check valve. The cartridge assembly is attachable to the body bore. The sleeve and housing are biased with respect to each other to a normal position and they have a detent ball mechanism cooperating with them so that a male coupler can be insertably held within the sleeve by pushing the male coupler inwardly under force, and the male coupler can be uncoupled by pulling the male coupler out of the sleeve with force. The sleeve has a bore with a seat therein which cooperates with the check valve which is urged within the bore to a position against the seat for blocking flow. The check valve is movable away from the seat for allowing flow. The check valve contains a detent ball mechanism for locking the check valve with respect to the sleeve in a position away from the seat during normal operational flow of the female coupler.

11 Claims, 6 Drawing Figures

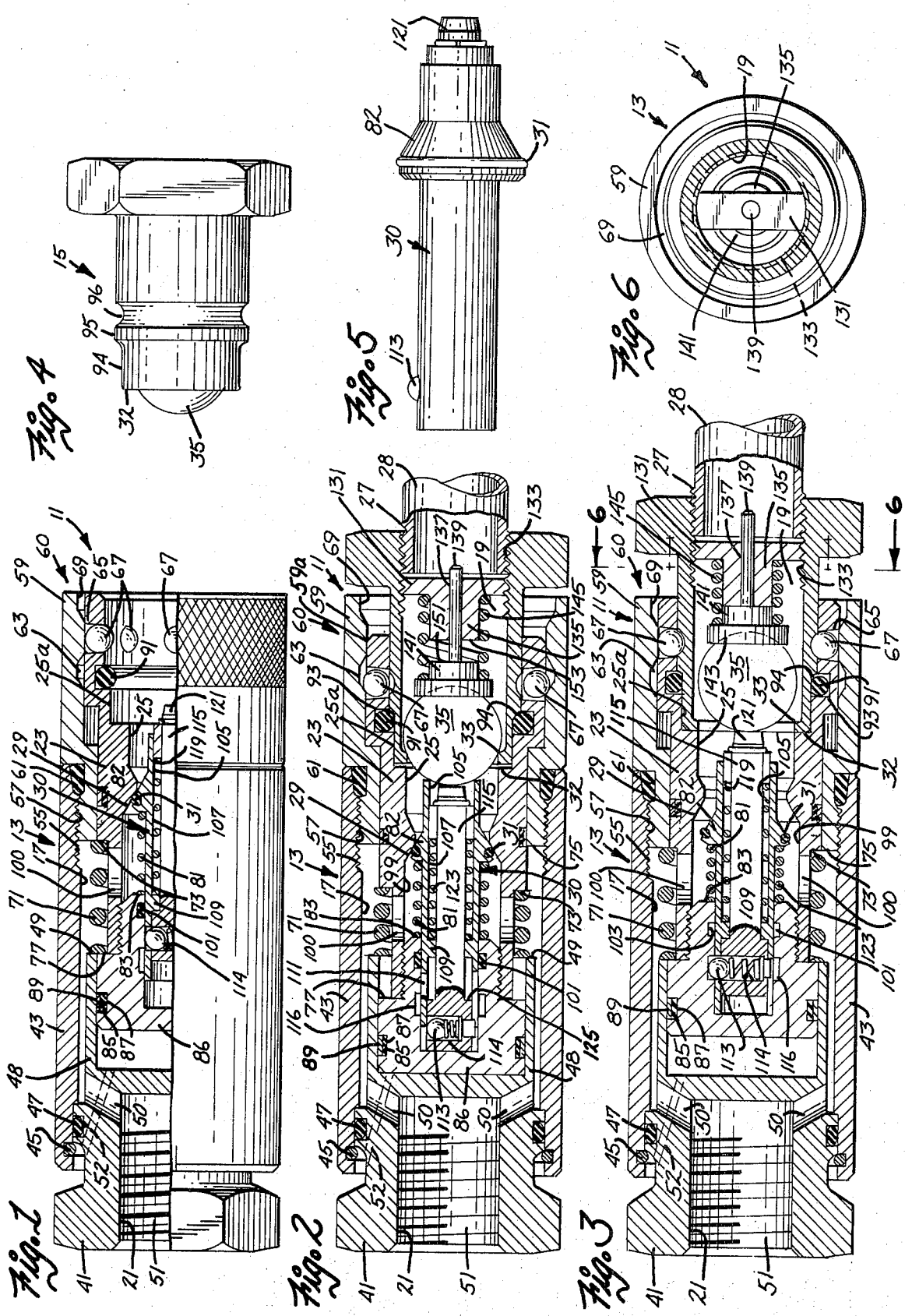

3,791,411

HYDRAULIC COUPLER

BACKGROUND OF THE INVENTION

1. Field of the Invention

This invention relates generally to couplers for lines or conduits carrying fluid under pressure and more particularly concerns means by which the lines may be easily connected or disconnected without the escape of fluid.

2. Description of the Prior Art

The conventional coupling devices now available for use in interconnecting conduit sections carrying fluid under pressure are comprised of tubular body members of the male and female type which are usually interfitted and locked together in communicating relationship. These body members are provided with interior check valves, most of which are of the ball type, which are urged into closed relation by resilient means and which open to provide flow.

In order to provide coupling of the two coupling devices the prior art uses a sleeve located outside of the female coupling device which sleeve must be moved manually in order to provide for the insertion of the male member. Generally the sleeve is spring biased and the holding of the male member can be accomplished by means of detent balls. For examples of the prior art locking mechanism reference should be had to U.S. Pat. No. 2,706,646 issued to E. T. Olson and U.S. Pat No. 3,163,178 issued to P. E. Stratman. These types of coupling mechanisms have a number of drawbacks.

Initially, they are very difficult to couple together as nearly three hands are needed. One hand is needed to hold the female coupler, one to move the sleeve with respect to the female coupler, and a third to move the male member within the female coupler. Upon uncoupling, the process is as difficult.

Additionally, a drawback of this type of coupling is the inability to provide uncoupling when the implement such as a plow or the like strikes an imbedded object causing the pulling of one coupling device with respect to the other to prevent damage to the hydraulic system. In order to overcome this the prior art apparatus had to utilize a bracket which is connected to the movable sleeve and also to some base reference so that if the male member is pulled it can additionally move the female member with respect to the sleeve which is held stationary by a bracket so that the male member can be disconnected. Further, because of the existence of the external sleeve the prior art does not have a coupling apparatus whereby rather than using individual female couplers, a manifold having a plurality of female sockets may be used for the insertion of a plurality of male members.

SUMMARY OF THE INVENTION

In accordance with the invention a female cartridge assembly is insertable within a tubular device or manifold adapted to receive hydraulic flow to provide a female coupler. The cartridge has a housing which is attachable within the tubular device or manifold, a sleeve interior of the housing which is movable with respect to the housing and biased to a normal position therein, and a check valve assembly within the sleeve. The sleeve and housing have a detent ball mechanism whereby a male coupler is insertably held within the female coupler by pushing the male coupler inward under force, and the male coupler is uncoupled by pulling the male coupler out of the female coupler with force.

Accordingly, it is an object of the present invention to provide the female coupler having a coupling mechanism thereon with an interior sleeve allowing for ease of coupling and uncoupling.

It is a further object of the present invention to provide a female coupling cartridge having the novel coupling means thereon which cartridge can be inserted into a standard tubular housing adapted to receive a source of fluid or into a manifold having a plurality of housings for receiving fluid.

BRIEF DESCRIPTION OF THE DRAWINGS

Other objects and advantages of the invention will become apparent upon reading the following detailed description and upon reference to the drawings, in which:

FIG. 1 is a view in side elevation, portions shown in section, of the female coupling cartridge secured to a tubular member;

FIG. 2 is a view similar to FIG. 1 of a female coupler in the process of being coupled with a male coupler;

FIG. 3 is a view similar to FIG. 1 of a completely coupled hydraulic coupling in a position for the flow of fluid therethrough;

FIG. 4 is a view in side elevation of the male coupler;

FIG. 5 is a view in side elevation of the check valve; and

FIG. 6 is a view taken along line 6—6 of FIG. 3.

DETAILED DESCRIPTION OF THE DRAWINGS

Referring now to the drawings it will be seen that a coupling device, designated generally by the reference numeral 11 is there shown. The hydraulic coupling device 11 includes a pair of tubular, telescopically interfitting body members designated generally as 13 and 15. Member 13 can be seen with reference to FIG. 1 and member 15 can be seen with reference to FIG. 3. In FIG. 2 the two units are shown together.

Members 13 and 15 have axial bores 17 and 19, respectively, therethrough. The body member 13, which may be referred to as a socket or female member, is adapted with threads 21 to be connected with a conduit or line from a hydraulic pump or source of hydraulic fluid under pressure. Located within bore 17 is an inside sleeve 23 which is longitudinally movable with respect to the body member 13. The inside sleeve 23 has an inside bore 25 having a diametrically enlarged portion 25a adjacent the extremity thereof to telescopically accommodate the second body member 15 which may be referred to as the tip or male body member. The tip 15 may be connected by its threads 27 with the line 28 of an actuated implement. The bore 25 of the inside sleeve 23 is diametrically and uniformly reduced, behind the tip-receiving enlargement 25a to form an annular seat 29 in which a check valve assembly 30, shown in FIG. 4, is adapted to be nicely seated. The actual seating is by an O-ring 31 located on the check valve assembly.

Formed just rearward of the forward extremity 32 of the male or tip body member 15, the bore 19 is reduced to form a valve seat 33 adapted to receive the ball or spheroid valve element 35. When the assembly is not coupled, the valve assembly 30 and the ball 35 are seated in their respective seats 29 and 33 for preventing the flow of the hydraulic fluid. In operation, as seen in FIG. 3, the check valve 30 is separated from the seat 29 for providing flow and the ball 35 is separated from the seat 33 for providing flow.

Referring now to FIG. 1 the body 13 has at the rearward end thereof an end cap 41. The end cap 41 is secured to the cylindrical portion 43 of the body 13 by snap ring 45 and sealed by O-ring 47. The end cap 41 has cylindrical portion 48 terminating in an annular shoulder 49 at the front end thereof. A plurality of bores 50 extend from the opening 51 in the end cap 41 to the outside of the cylindrical portion 48 and into the bore 17. An air vent 52 extends from exterior of the body 13 inwardly to the inside bore 17.

Near the forward end of the cylindrical portion 43 of the body 13 threads 55 are provided for engagement with threads 57 of a housing 59. An O-ring 61 helps seal the portion 43 and housing 59. The housing 59 can be a part of the body 13 or it can be a separate part of a cartridge assembly 60 which is insertable within the bore 17 and includes the sleeve 23 and the check valve 30. The advantage of using a cartridge assembly 60 is that a plurality of them can then be inserted within a manifold having a plurality of bores which are adapted to receive fluid flow. Then, a plurality of male tips 15 can be inserted into a single manifold.

The housing 59 is provided with a shallow detent or annular groove 63 having sloping sides, and this groove can be made to register with a plurality of radial apertures 65 in the inside sleeve 23 which apertures loosely accommodate detent balls 67. The diameter of the apertures 65 is smaller at the inside surface of the sleeve 23 than at the outside surface. The diameter of the balls 67 is larger than the diameter of the apertures 65 at the inside surface but smaller than at the outside surface, and thus when pushed from inside sleeve 23 may be made to move into detent 63. A second shallow detent or annular groove 69 is provided forward of detent 63 in the body 59 for alignment with the apertures 65 when the internal sleeve 23 is moved longitudinally to the right with respect to the body 13.

An elongated compression coil spring 71 is disposed within the bore 17 around the sleeve 23 for biasing the sleeve 23 with respect to the body 13 to the position shown in FIG. 1 between the detents 63 and 69. The forward coil of the spring abuts a shoulder 73 on the sleeve 23 and a shoulder 75 on the housing 59 and the rearward coil of the spring abuts shoulder 77 on the sleeve 23 and the shoulder 49 on the end cap 41 of the body 13. An additional elongated compression coil spring 81 is provided around the check valve 30 between the annular boss 82 of of the check valve 30 and a shoulder 83 of the sleeve 23 for biasing the check valve 30 with respect to the sleeve 23.

Near the rearward end of the sleeve 23 the sleeve has a threaded end cap 86 having an annular O-ring 85 located within an annular groove 87 of the end cap 86 and the O-ring 85 has a seal 89 exterior thereof for slidable contact within the cylindrical portion 48 of the end cap 41. Near the forward end of the interior sleeve 23 an O-ring 91 is arranged in a groove 93 in the sleeve 23 for abutment with the cylindrical portion 94 and the annular boss 95 on the body 15 for preventing fluid escape when the lines are coupled. When the lines are coupled the detent ball 67 is located within a groove 96 which is just behind boss 95 on body 15. The top part of the ball 67 abuts the portion 59a of the inside of sleeve 23.

The check valve 30 is movable within a bore 99 of the sleeve 23. The bore 99 communicates with the bore 17 by four holes 100 located within the walls of the sleeve 23. An O-ring 101 is inserted within an annular groove 103 within the sleeve 23 for frictional contact with the check valve 30. Check valve 30 has a bore 105 therein and a generally cylindrical wall 107 having an inwardly directed annular boss 109. Within the cylindrical wall 107, at the top thereof, an opening 111 is provided through which opening a spring biased ball 113, contained within a hole 114 within a piston 115 may be projected for partial insertion within an opening 116 in the sleeve 23 for the locking of the piston 115, the check valve 30, and the sleeve 23, all with respect to each other. The internal piston 115 has an annular shoulder 119 and a nose portion 121 both near the forward end thereof. An elongated compression coil spring 123 surrounds the piston 115 with the forward coil thereof being in contact with the shoulder 119 of the piston 115 and the rearward coil thereof being in contact with the shoulder 109 of the check valve 30 for biasing the piston 115 outwardly with respect to the check valve 30 and the bore 105. The abutment of an annular shoulder 125 of the piston 115 against the boss 109 prevents the total movement of the piston out of the bore 105.

Referring now to the body 15, an end piece 131 is externally threaded to screw into the threads 133 in the body 15 to act as a stationary guide. The end piece 131 is provided with a short sleeve portion 135 extending toward the associated ball 35 and having an axial bore 137 for the slidable accommodation of a guide stem 139. The guide stem 139 is connected to the ball 35 by the ball engaging follower 141 having a shoulder 143 thereon. An elongated compression coil spring 145 is mounted between the shoulder 143 and the end 131 for biasing the ball 35 away from the end 131 and into the seat 33. When the ball 35 is moved away from the seat 33 the rearward end 151 of the follower 141 abuts the forward end 153 of the sleeve portion 135 to limit the rearward movement of the ball 35 and consequently the total flow opening between the seat 33 and the ball 35.

In operation, with fluid pressure to the female body 13, the body portion 15 is coupled with the body 13 by first causing the boss 95 on the body 15 to contact the detent balls 67. As the detent balls cannot move outwardly until they reach the groove 63 the insertion of the body 15 causes the sleeve 23 to move longitudinally to the left as seen on the drawings. This movement is resisted by the spring 71. After the sleeve has moved sufficiently inwardly under the pressure of the body 15 the aperture 65 will arrive at the detent 63 thereby allowing the detent balls 67 to move outwardly into the detent 63. This allows the member 15 to move fully within the internal sleeve 23 as shown in FIG. 2.

In addition to the body 15 being fully inserted within the sleeve 23 the sleeve 23 can be seen to have moved to the rearward left end of the bore 17. The movement of the sleeve 23 rearwardly causes the movement of the check valve 30 rearwardly as the annular boss 29 of the sleeve 23 is continually abutting the O-ring 31 and boss portion 82 of the check valve 30. However, it is to be noted that there is no movement of check valve 30 with respect to sleeve 23.

As the member 15 is moved inwardly of the sleeve 23 the ball 35 contacts the nose 121 of the piston 115 and moves the piston 115 rearwardly with respect to the check valve 30 since the spring 145 is of greater strength than the spring 123 biasing the piston 115 with respect to the check valve 30. It is to be noted that the spring 123 is of a greater strength than the spring 81 and consequently with the ball 35 moving rearwardly within the sleeve 23 it would normally be expected that the piston 115 would not move within the check valve 30 but that the check valve 30 would move rearwardly with respect to the sleeve 23. However, this event does not occur as the positive pressure from the fluid source exerts a force on the shoulder 82 of the check valve 30 which force, when combined with the force of spring 81 is greater than the force of the spring 123.

As the pressure is released in applying the body 15 into the sleeve 23 the spring 71 causes the sleeve 23 to move outwardly, to the right as shown in the drawings, to the position of a sleeve as shown in FIG. 3. With the detent ball 67 out of the annular groove 63 and against the sides of the portion 25a of the body 13 and into the groove 96 within the body 15 the body 15 is now fully coupled with the body 13. It should be noted that, although not shown, in this interim position the check valve 30 is still seated against the seat 23 and the ball 35 is still against the seat 33. In order to provide for flow through the coupling 11, the pressure at the source is decreased whereby spring 123 overcomes spring 81 and moves check valve 30 rearwardly abutting the end cap 86 of the internal sleeve 23 as shown in FIG. 3. The fluid pressure is then increased and fluid is allowed to flow through cavity 17, through holes 100 within the sleeve 23, and into the cavity 99 within the sleeve 23, after which the flow can flow between the shoulder 82 on the check valve 30 and the seat 29.

With positive flow at the ball 35 the force of the flow causes the ball 35 to move rearwardly against the spring 143 and to provide a flow path between the ball 35 and the seat 33. As the ball 35 has moved rearwardly within the body 15, to the right as shown in the drawings, the spring 123 moves the piston 115 outwardly of the check valve 30, to the right as shown in the drawings, which moves the spring bias detent ball 113 in line with the hole 111 in the check valve 30 and the hole 116 in the sleeve 23 so that the ball 113 moves upwardly to lock the piston 115, the check valve 30, and the sleeve 23, all with respect to each other. The final operating position is shown in FIG. 3. With the ball follower 141 stopped against the shoulder 153 of the sleeve 135, and more importantly because of the locking relationship provided by the detent ball 113 there will not be a movement of either the ball 35 or the check valve 30 as a result of normal fluctuations in the pressure of the fluid flowing through the coupling 11.

The coupling mechanism functions in a different manner if the coupling is accomplished while there is no fluid pressure to the female body 13. Upon insertion of the body 15 within the body 13 the boss 95 on the body 15 begins to contact the detent ball 67. As the detent balls cannot move outwardly until they reach the groove 63 the insertion of the body 15 causes the sleeve 23 to move longitudinally to the left as seen on the drawing. This movement is of course resisted by the spring 71. After the sleeve has moved sufficiently inwardly under the pressure of the body 15 the aperture 65 will arrive at the detent 63 thereby allowing the detent balls 67 to move outwardly within the detent 63. This allows the member 15 to move fully within the internal sleeve 23.

As the member 15 is moved inwardly of the sleeve 23 the ball 35 contacts the nose 121 of the piston 115 tending to move the piston 115 rearwardly. This caused the check valve 30 to move rearwardly as the spring 123 is stronger than the spring 81. The check valve 30 moves to the position shown in FIG. 3 against the end cap 86 with the hole 111 in the check valve 30 in line with the hole 116 in the sleeve 23. In this position the annular boss 82 is away from the seat 29. After the check valve 30 has dead ended against the end cap 86 the piston 115 moves rearwardly such that the spring bias detent ball 113 moves rearward of the holes 111 and 116 near the end cap 86.

Fluid may now be introduced into the cavity 17 by actuating the pressure source which fluid is then free to flow through the holes 100 in the sleeve 23, the bore 99, past the boss 82 and seat 29 and exert a force on the ball 35. The exertion of the fluid force causes the ball 35 to move rearwardly against the force of spring 145 and to seat the rearward end 151 of the follower 141 against the forward end 153 of the sleeve portion 155. With the rearward movement of the ball 35 with respect to the body 15 the spring 123 then causes the piston 115 to move outwardly, to the right as shown in the drawings, which brings the detent ball 113 in line with the holes 111 and 116 in order to lock the piston 115, the check valve 30 and the sleeve 23, all with respect to each other.

An advantage of this type of coupling is the ease of uncoupling particularly when the implement such as a plow or the like strikes an imbedded object thereby preventing damage to the hydraulic system. If one of the bodies 13 or 15 should be moved outwardly with respect to the other the boss 95 upon the body 15 will continually make contact with the detent ball 67 thus moving the sleeve 23 outwardly, to the right as shown in the drawings, with respect to the body 13. The spring 71 will resist this outward movement as it is being extended. As the spring 71 is further extended and the sleeve 23 is moved outwardly with respect to the body 13 the ball 67 will finally reach the annular groove 69 within the housing 59 wherein the detent ball 67 will be forced by the boss 96 into groove 69 and the ball 15 will then uncouple from the body 13. Without the ball 35 acting upon the piston 115, biasing the check valves 23 rearwardly, the spring 81 will instantaneously move the check valve 23 forward with the shoulder 82 and O-ring 31 abutting the seat 29 thereby preventing the loss of fluid through the body 13. And, without the pressure of flow existing on the ball 35 the spring 145 and the pressure on boss 92 will cause the ball 35 to seat against the seat 33 thereby preventing the loss of fluid flow from the implement being powered.

Thus it is apparent that there has been provided, in accordance with the invention, a female coupler that fully satisfies the objects set forth above. While the invention has been described in conjunction with a specific embodiment thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A female coupler for coupling and uncoupling a source of hydraulic fluid under pressure with a male tip which leads to an implement to receive said fluid, comprising:
   a. a tubular body member defining a bore therein, said body member including means to receive said source of hydraulic fluid to said bore, said bore defining an interior wall with a pair of spaced apart detents, said bore having a longitudinal axis;
   b. a sleeve located interior of said tubular body member and movable with respect thereto along said longitudinal axis, said sleeve having an exterior surface and an interior surface defining a cavity for receiving said male tip, said sleeve having an aperture therein extending from said interior surface to said exterior surface, said aperture having a greater diameter at said outside surface than at said interior surface;
   c. a ball located within said aperture, said ball having a diameter greater than said aperture diameter at said interior surface; and
   d. means for urging said sleeve along said longitudinal axis to a normal position with respect to said body member wherein said ball is located against said interior wall of said body member between said first and said second detents with said ball partially protruding into said cavity of said sleeve and for allowing longitudinal movements of said sleeve with respect to said body member for alignment of said sleeve aperture with either of said detents.

2. The female coupler of claim 1, wherein:
   a. said tubular body member cavity contains first and second oppositely facing annular shoulders therein;
   b. said sleeve contains first and second oppositely facing annular shoulders; and
   c. said means for urging said sleeve along said longitudinal axis to a normal position with respect to said body member includes a coil spring located around said sleeve with one end of said spring normally in contact with said first annular shoulder of said body member and said first annular shoulder of said sleeve and the other end of said coil spring normally in contact with said second shoulder of said body member and said second shoulder of said sleeve.

3. The improved female coupler of claim 1 wherein said sleeve interior surface contains an annular boss, and including:
   a. a check valve member, said member having a seating surface thereon for seating against said annular boss of said sleeve; and
   b. second biasing means biasing said check valve member with respect to said sleeve for urging said check valve member seating surface against said sleeve annular boss.

4. The female coupler of claim 3 wherein said sleeve has a hole therein extending from said exterior surface to said interior surface for receiving flow from said bore of said tubular body member into said sleeve cavity.

5. The female coupler of claim 4 wherein said check valve is a longitudinally extending member having an outside surface and an inside surface defining a longitudinally extending bore, including:
   a. a longitudinally extending piston located within said check valve bore for longitudinal movement with respect to said bore;
   b. means urging said piston in a longitudinal direction out of said check valve bore;
   c. means restraining the total movement of said piston out of said check valve bore; and
   d. means locking said piston, said check valve, and said sleeve with respect to each other upon a particular alignment of said piston, said check valve, and said sleeve.

6. The female coupler of claim 5 wherein said means locking said piston, said check valve, and said sleeve with respect to each other includes:
   a. a detent located within said sleeve;
   b. an aperture extending from said outside surface of said check valve to said inside surface of said check valve;
   c. a hole extending into said piston; and
   d. a spring biased ball located within said piston for the movement of said ball through said aperture and into said detent for locking said piston, said check valve, and said sleeve with respect to each other upon alignment of said sleeve detent, said check valve aperture and said piston hole.

7. A hydraulic coupler cartridge for attachment within a bore of a body adapted to receive a supply of fluid, said body having a shoulder facing the opening of said bore, comprising:
   a. a housing having means for attachment to said body, said housing defining a cavity therein with an interior wall having a pair of spaced apart detents, said cavity having a longitudinal axis;
   b. a sleeve located interior of said housing and movable with respect thereto along said longitudinal axis, said sleeve having an exterior surface and an interior surface defining a cavity, said sleeve having an aperture therein extending from said interior surface to said exterior surface, said aperture having a greater diameter at said exterior surface than at said interior surface;
   c. a ball located within said aperture, said ball having a diameter greater than said aperture diameter at said interior surface; and
   d. means for cooperating with said bore shoulder, said sleeve, and said housing for urging said sleeve along said longitudinal axis to a normal position with respect to said housing wherein said ball is located against said interior wall of said housing between said first and said second detents with said ball partially protruding into said cavity of said sleeve and for allowing longitudinal movements of said sleeve with respect to said body member for alignment of said sleeve aperture with either of said detents.

8. The hydraulic coupler cartridge of claim 7 wherein:
   a. said housing has a shoulder facing said body shoulder;
   b. said sleeve contains first and second oppositely facing shoulders; and
   c. said biasing means includes a coil spring located around said sleeve with one end of said spring normally in contact with said shoulder of said body and said first shoulder of said sleeve and the other end of said coil spring normally in contact with said shoulder of said housing and said second shoulder of said sleeve.

9. The hydraulic coupler cartridge of claim 8 wherein said sleeve interior surface contains an annular boss, and including:
   a. a check valve member, said member having a seating surface thereon for seating against said annular boss of said sleeve; and
   b. second biasing means biasing said check valve member with respect to said sleeve for urging said check valve member seating surface against said sleeve annular boss.

10. The hydraulic coupler cartridge of claim 9 wherein said sleeve has a hole therein from said exterior surface to said interior surface for receiving flow from said bore opening of said tubular body member into said sleeve cavity.

11. The hydraulic coupler cartridge of claim 10 wherein said check valve is a longitudinally extending member having an outside surface and an inside surface defining a longitudinally extending bore, including:
   a. a longitudinally extending piston located within said check valve bore for longitudinal movement with respect to said bore;
   b. means urging said piston in a longitudinal direction out of said check valve bore;
   c. means restraining the total movement of said piston out of said check valve bore; and
   d. means locking said piston, said check valve, and said sleeve with respect to each other upon a particular alignment of said piston, said check valve, and said sleeve.

* * * * *